(12) United States Patent
Tatsumi et al.

(10) Patent No.: US 12,474,397 B2
(45) Date of Patent: Nov. 18, 2025

(54) SEMICONDUCTOR WAFER

(71) Applicant: Nippon Telegraph and Telephone Corporation, Tokyo (JP)

(72) Inventors: Shoko Tatsumi, Musashino (JP); Masahiro Nada, Musashino (JP); Yasuhiko Nakanishi, Musashino (JP); Shigeru Kanazawa, Musashino (JP)

(73) Assignee: NTT, INC., Tokyo (JP)

( * ) Notice: Subject to any disclaimer, the term of this patent is extended or adjusted under 35 U.S.C. 154(b) by 231 days.

(21) Appl. No.: 18/001,181

(22) PCT Filed: Jun. 16, 2020

(86) PCT No.: PCT/JP2020/023651
§ 371 (c)(1),
(2) Date: Dec. 8, 2022

(87) PCT Pub. No.: WO2021/255842
PCT Pub. Date: Dec. 23, 2021

(65) Prior Publication Data
US 2023/0228807 A1    Jul. 20, 2023

(51) Int. Cl.
*G01R 31/28* (2006.01)

(52) U.S. Cl.
CPC ............... *G01R 31/2855* (2013.01)

(58) Field of Classification Search
CPC .. G01R 31/2855; G01R 31/2884; H01L 22/00
See application file for complete search history.

(56) References Cited

U.S. PATENT DOCUMENTS

| | | | |
|---|---|---|---|
| 7,876,119 B2* | 1/2011 | Katoh | G01R 31/2891 438/18 |
| 2005/0212141 A1 | 9/2005 | Anzai | |
| 2006/0022691 A1* | 2/2006 | Watanabe | G01R 31/2884 324/762.02 |
| 2006/0097386 A1* | 5/2006 | Ertle | H01L 24/06 257/723 |
| 2007/0105248 A1 | 5/2007 | Katoh | |
| 2008/0088038 A1* | 4/2008 | Hsu | H01L 24/05 257/786 |
| 2010/0084761 A1* | 4/2010 | Shinagawa | H01L 25/0655 438/117 |

FOREIGN PATENT DOCUMENTS

| | | |
|---|---|---|
| JP | S62-31148 A | 2/1987 |
| JP | H06-5674 A | 1/1994 |
| JP | 2001-343426 A | 12/2001 |
| JP | 2005-285971 A | 10/2005 |
| JP | 2007-129108 A | 5/2007 |

\* cited by examiner

*Primary Examiner* — Dominic E Hawkins
(74) *Attorney, Agent, or Firm* — Workman Nydegger (57) ABSTRACT

This semiconductor wafer has formed therein a plurality of chips, each of which has incorporated therein a semiconductor element to be tested. The semiconductor wafer is characterized by comprising: first pads which are formed on the chips, and to which a plurality of probe needles are connected, the probe needles being connected to the semiconductor elements and used for testing the semiconductor elements; and a second pad that is used for performing a contact check on the probe needles, the second pad having a conductive section greater in length than the distance between the centers of the first pads.

7 Claims, 12 Drawing Sheets

SEMICONDUCTOR WAFER

TECHNICAL FIELD

The present invention relates to a semiconductor wafer, and particularly relates to a design of semiconductor elements for facilitating batch inspection in wafer units for a semiconductor wafer in which the semiconductor elements are individually formed in a plurality of chip regions arranged on a wafer.

BACKGROUND ART

Burn-in testing is widely known as a technique for reliability inspection of semiconductor elements. Burn-in testing is employed as a screening method in which semiconductor elements are operated at higher temperature and higher voltage than those of actual usage conditions for a certain period of time, and then, those whose characteristics deviate from the standard values are removed.

Conventionally, burn-in testing has been performed in such a manner that after a semiconductor wafer is processed into individual chips by dicing or the like, the chips are mounted on ceramic substrates or the like. However, in this method, it is necessary to mount the semiconductor chips before the inspection of the chips, and thus, defective products must be mounted in the same manner as non-defective products, which leads to a process requiring high costs. For this reason, wafer level burn-in testing in which burn-in can be performed at the semiconductor wafer level before chip mounting has come to be widely used at a site of mass production.

Wafer level burn-in uses a probe card in which a large number of pins corresponding to chips are arranged and that enables collective electrical contact with many semiconductor elements on a semiconductor wafer. The large number of pins (probe needles) arranged in the probe card are individually switched electrically at high speed to be connected to a measuring instrument, thereby allowing evaluation of characteristics and burn-in of each element to be effectively performed.

CITATION LIST

Patent Literature

PTL 1: JP 2007-129108 A

SUMMARY OF THE INVENTION

Technical Problem

In performing mass inspection of a large number of elements produced on a semiconductor wafer in a batch, performing the inspection while the probe needles provided in the probe card are in a defective state directly leads to an increase in defective product rate and a decrease in throughput. Thus, the contact state of the probe needles is checked (contact check) before the inspection.

As a method for the contact check of the probe needles, there is a simple method in which a large number of probe needles are brought into contact with a conductive substrate (such as a metal plate) having a size larger than that of the entire range of the wafer and being other than the semiconductor wafer and are checked. However, the method can check only contact failure with the conductive substrate. Unlike the conductive substrate, an actual semiconductor wafer has warpage due to an epitaxial layer, unevenness due to the process, or the like, and is not a complete plane. Further, when the measurement is performed at a temperature different from a normal temperature, the states of the wafer and the tips of the probe needles may change, and thus, a method capable of performing contact check in an actual measurement environment is required.

PTL 1 has proposed to prepare a contact check pattern having the same dimensions as those of a chip pattern to be inspected. However, the method requires forming a pattern with an element only for the contact check. Additionally, when contact check is performed for a large number of probe needles of the entire probe card, an area of a pad for the contact check increases, affecting areas of semiconductor elements to be obtained throughout the wafer. Thus, the arrangement design of elements of the entire wafer is greatly limited.

The present invention has been made to solve the above problems, and an object thereof is to more easily achieve the contact check of the probe needles of the entire probe card at a temperature different from a normal temperature to simplify designing.

Means for Solving the Problem

Examples of embodiments of the present invention include the following configurations to achieve the above object.

Configuration 1

A semiconductor wafer formed with a plurality of chips each of which is formed with a semiconductor element to be inspected, the semiconductor wafer including:

a plurality of first pads each of which is formed on a chip of the plurality of chips and each of which is configured to be connected with a probe needle to be connected to the semiconductor element, the probe needle being used for inspection of the semiconductor element; and a second pad to be used for contact check of the probe needle, the second pad having a conductive portion whose length is longer than a center-to-center distance of the plurality of first pads.

Configuration 2

The semiconductor wafer according to configuration 1, wherein the second pad is conductive to a part of the first pad within a range where inspection of the semiconductor element is not disturbed.

Configuration 3

The semiconductor wafer according to configuration 1, wherein the second pad is present outside a scribe line of the chip and is connected to a second pad of another adjacent chip.

Configuration 4

The semiconductor wafer according to configuration 1, wherein a plurality of the second pads are disposed for one chip.

Configuration 5

The semiconductor wafer according to configuration 1, wherein the second pad includes a pad portion whose minimum width is equal to or larger than 50 μm, is disposed in the chip in a horizontally and vertically symmetrical manner, and is provided for every chip.

Configuration 6

The semiconductor wafer according to configuration 1, wherein the second pad includes a conductive portion whose length is larger than the center-to-center distance of the plurality of first pads at at least one or more positions in each of a vertical direction and a horizontal direction of the chip.
Configuration 7

The semiconductor wafer according to configuration 1, wherein the second pad is also used for flip-chip connection.
Configuration 8

The semiconductor wafer according to configuration 1, wherein a plurality of the second pads are disposed in one chip, and all of the plurality of the second pads are conductive.

Effects of the Invention

According to the present invention described above, contact check of the probe needles can be performed with just a simpler electrode pattern without forming a semiconductor element for testing. In addition, at least only two probe needles are required to be present in the same electrode pattern, and even when a large number of probe needles are present, it is possible to flexibly design a pattern, compared to a case where contact check is performed by using a semiconductor element. When the second pad also serves as a flip chip, a space to be used only for the contact check is not required, and the elements can be more efficiently formed on the wafer.

DESCRIPTION OF EMBODIMENTS

Hereinafter, embodiments of the present invention will be described in detail with reference to the drawings.

First Embodiment

Figure 1:
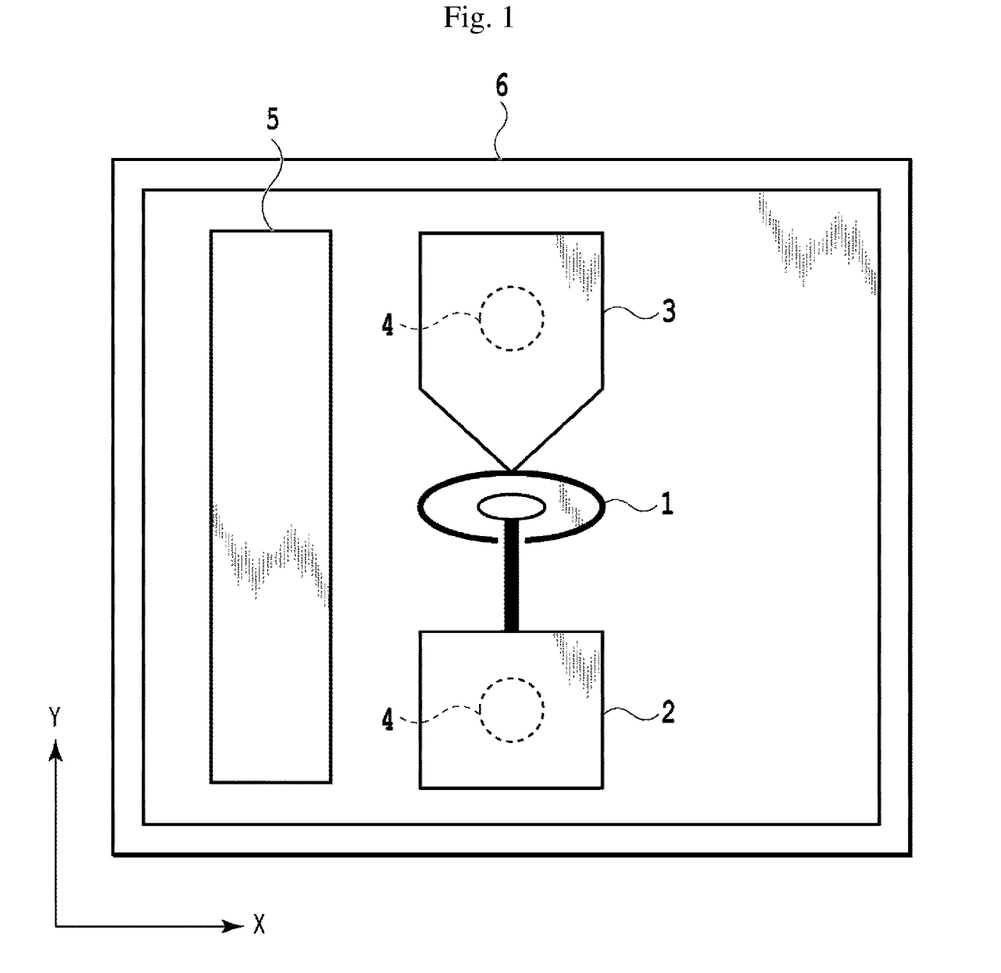
FIG. 1 is a schematic top view of one chip of a semiconductor wafer according to a first embodiment of the present invention.
Figure 2:
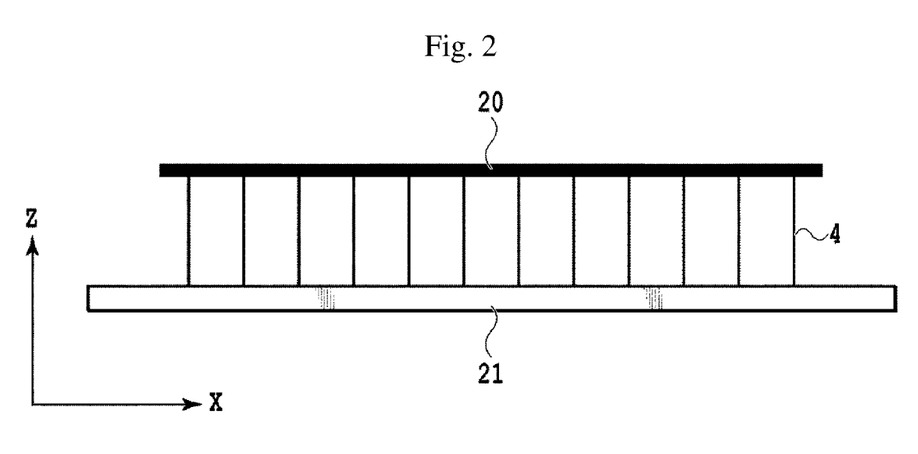
FIG. 2 is a schematic side view of an entire semiconductor wafer according to the present invention when contact check is performed.

FIG. 1 illustrates a schematic top view of one chip of a semiconductor wafer of a first embodiment of the present invention. FIG. 2 is a schematic side view of an entire semiconductor wafer according to the present invention when contact check is performed.

On the semiconductor wafer according to the first embodiment of the present invention, chip regions of a plurality of photodiodes (PD) 1 are formed in an array as one example of semiconductor elements. FIG. 1 illustrates a region for one chip among the semiconductor elements on the semiconductor wafer with the region surrounded by a scribe line 6 (a region to be cut and removed in order to detach the semiconductor chip) illustrated by a square drawn by a thick line.

In FIG. 1, the photodiode (PD) 1 for which an exemplary schematic shape is illustrated by using dual ellipses is connected with first pads 2 and 3 as pads (electrodes) to be used for inspection of input/output terminals and a semiconductor element, and a position where a tip of a probe needle 4 to be connected during each inspection touches is illustrated by using a small dotted circle. Also, a second pad 5 to be used for contact check of the probe needle is illustrated in a vertically long rectangular shape on the left side of FIG. 1. The second pad 5 may be conductive to a part of the first pad (for example, an electrode having a ground potential, or the like) within a range where inspection of the semiconductor element is not disturbed.

Note that, although the same applies to the following figures, the first electrode 3 is conductive only to an outer ring electrode of the PD 1, and the first electrode 2 is conductive only to an electrode of an inner elliptical portion of the PD 1. It should be noted that a line extending from the electrode 2 to the electrode of the inner elliptical portion of the PD 1 and the outer ring electrode of the PD 1 are not connected (are insulated).

In FIG. 2, in the side view of the entire semiconductor wafer when contact check is performed, a state is illustrated in which a plurality of probe needles 4 are aligned in a Z-axis direction on a lower surface of a probe card 20 facing a wafer 21 and contacting the wafer 21. On the wafer 21, a plurality of chip regions in each of which the semiconductor element (photodiode, PD) 1 as illustrated in FIG. 1 is formed as a semiconductor element to be inspected are formed in an array. In the chip region inside the scribe line 6 of the chip of each semiconductor element, the PD 1, the first pads 2 and 3 for applying voltage for inspection from the probe needles to the PD 1 above and below the PD 1, and the second pad 5 to be used for contact check of the probe needles are included.

Figure 3:
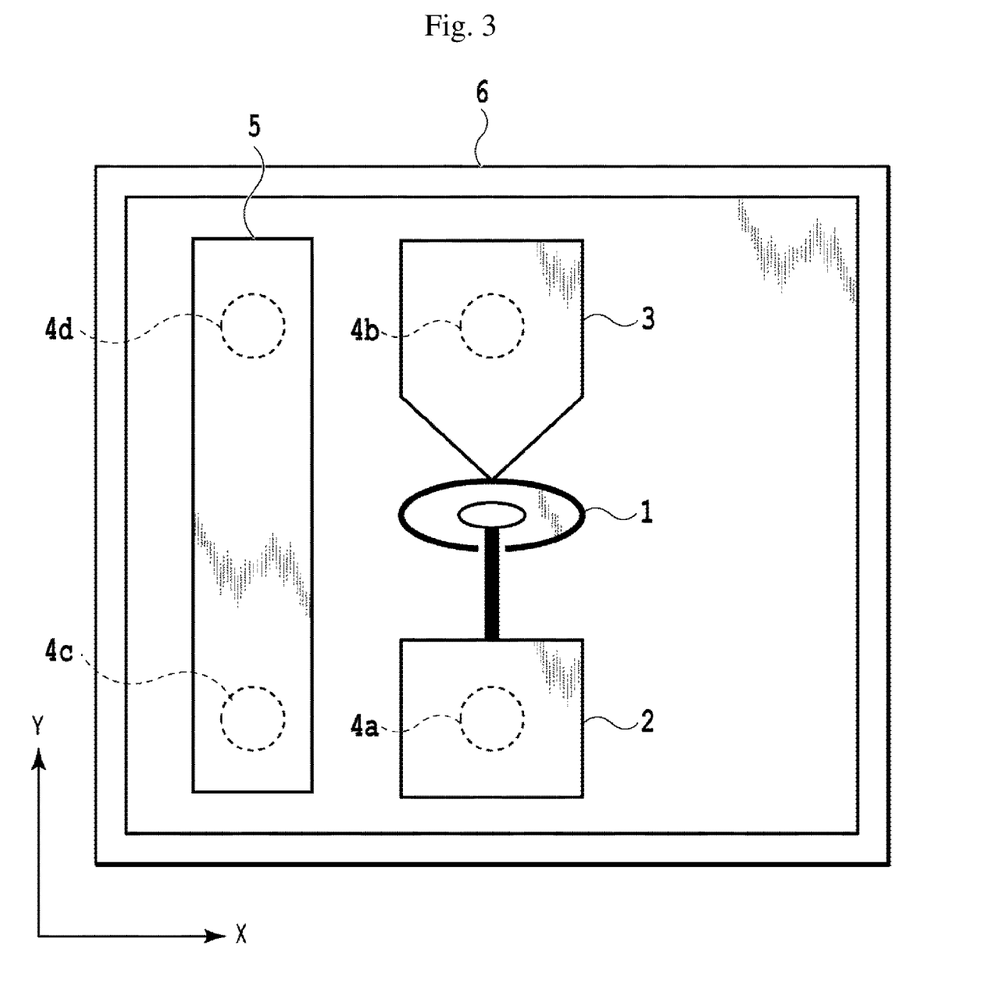
FIG. 3 is a top view of Example 1 of a chip region of the semiconductor wafer according to the first embodiment of the present invention.

In FIG. 3, as Example 1 of the chip region of the semiconductor wafer according to the first embodiment, positions of the probe 4 during the contact check and the inspection are illustrated by using dotted circles 4a to 4d. The second pad 5 for the contact check is formed in a vertically long rectangular shape in such a manner to have a conductive portion having a length longer than a distance between centers of the first pads 2 and 3 inside the scribe line 6. The probe needles are disposed in a one-to-one manner on the first pads 2 and 3 at positions of the dotted circles 4a and 4b, and by using two probe needles in total per chip, the contact check and the element inspection in which voltage is applied to the PD 1 are performed.

When the contact check is performed, the probe needles are moved along with the probe card to positions where the probe needles contact the second pad 5, and when the element inspection is performed, the probe needles are moved to positions where the probe needles contact the first pads 2 and 3 in the one-to-one manner.

Size of Second Pad

With reference to FIG. 3, the size of the second pad 5 will be described. A length of the second pad 5 in a Y direction is only required to be longer than a distance in the Y direction between two of the probe needles 4a and 4b, that is, the distance between the centers of the first pads 2 and 3.

Also, a size (width) of the second pad 5 in an X direction is only required to be longer than a diameter of the probe needle. The diameter of the probe needle is only required to be equal to or larger than 10 µm in the X direction, because probe needles having a diameter being equal to or larger than 10 µm are main products in the market. That is, the second pad 5 does not need to have the same width and length as those of the first pads 2 and 3.

Figure 4:
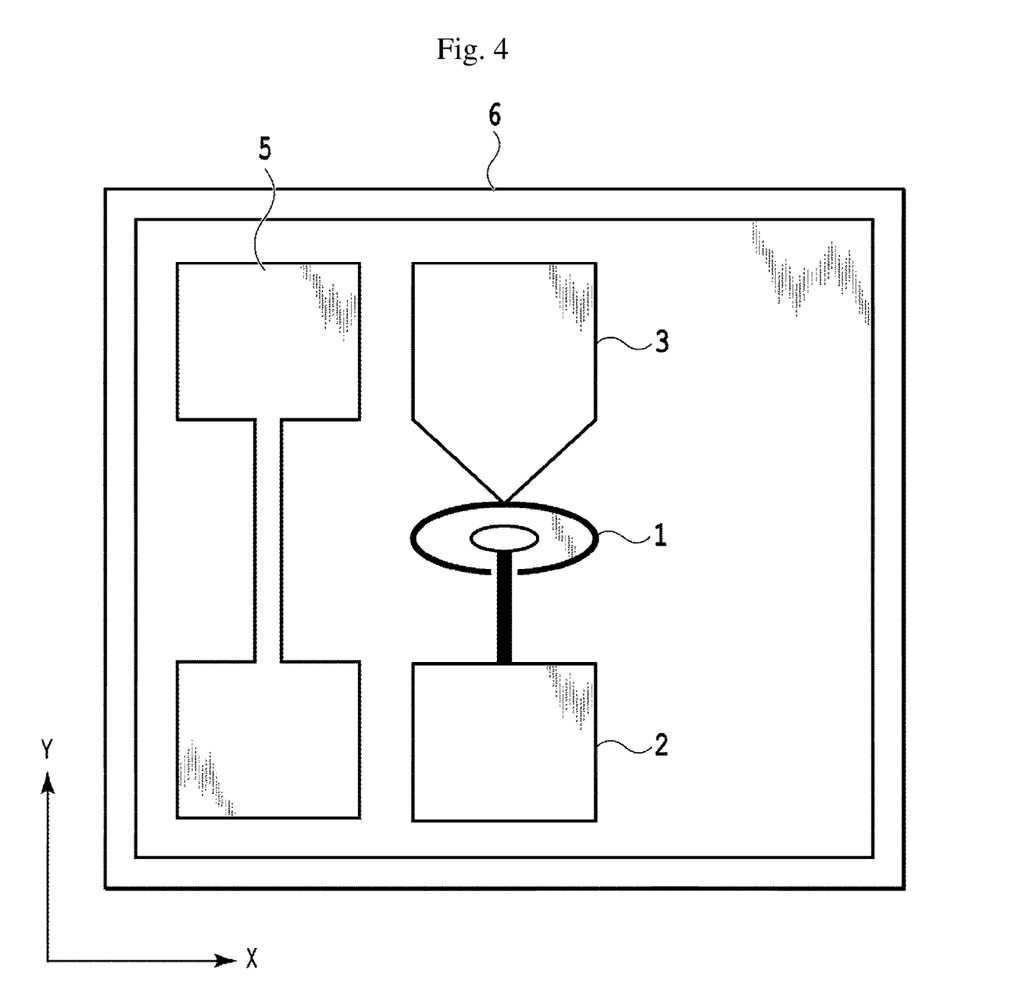
FIG. 4 is a top view of Example 2 of the chip region of the semiconductor wafer according to the first embodiment of the present invention.

Additionally, as illustrated in FIG. 1, the second pad 5 may have a rectangular shape, and as illustrated in Example 2 of the first embodiment in FIG. 41-2, may have a shape in which two pad portions whose Y coordinates correspond to those of the first pads 2 and 3 are vertically connected, and only a part of an electrode having a narrow width is conducted. In addition, the two pad portions of the second pad 5 in FIG. 4 that the probe needles 4c and 4d touch may have another shape such as a circular shape, rather than a rectangular shape.

Figure 5:
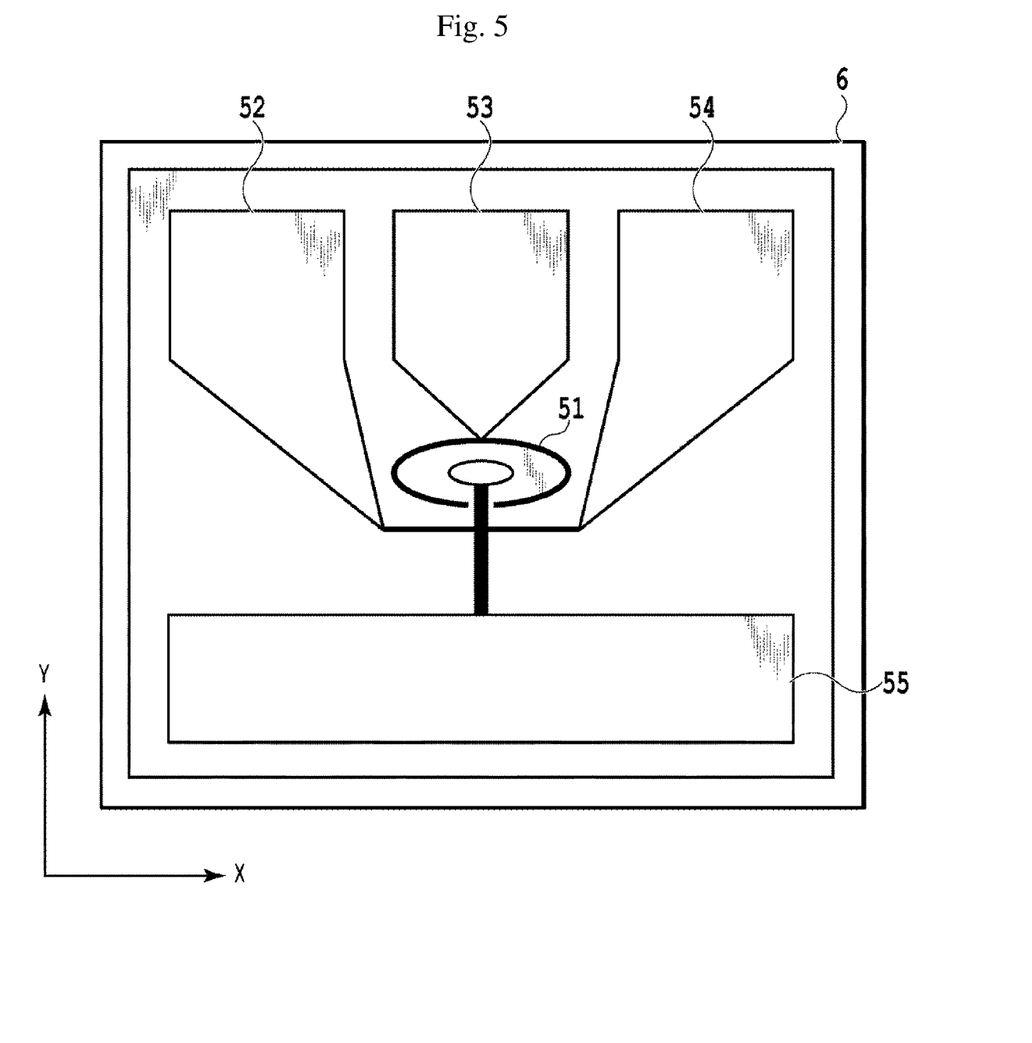
FIG. 5 is a top view of Example 3 of the chip region of the semiconductor wafer according to the first embodiment of the present invention.

FIG. 5 illustrates, as Example 3 of the first embodiment, a case where a pad portion of the first pad (corresponding to the first pad 2 in FIG. 1) connected to a lower side of a PD 51 is separated and arranged in two portions 52 and 54 on the left and right of the PD 51, and three first pad portions 52, 53, and 54 are present. In this case, a second pad 55 is formed, as illustrated in the lower portion of FIG. 5, in a horizontally long rectangular shape. A size of the second pad 55 is only required, in an X direction, to be equal to or larger than a length obtained by adding the diameter of the needle to a distance in the X direction of three probe needles, that is, a center distance from the pad portion 52 to the pad portion 54 at both ends inside the scribe line 6, and is only required, in the Y direction, to have a length being equal to or larger than the diameter of the probe needle.

In all of the following embodiments, including the examples of the first embodiment described above, position deviation is considered to occur due to the influence of thermal expansion or the like, particularly at a wafer end, and thus, when measurement is performed at high temperature, a margin where the thermal expansion is taken into consideration needs to be provided for the arrangement and sizes of the first and second pads.

Additionally, in all embodiments, the formed element may also be an element including two or more terminals such as a transistor, for example, instead of the PD as long as the formed element is an element that performs electrical measurement.

Second Embodiment

Figure 6:
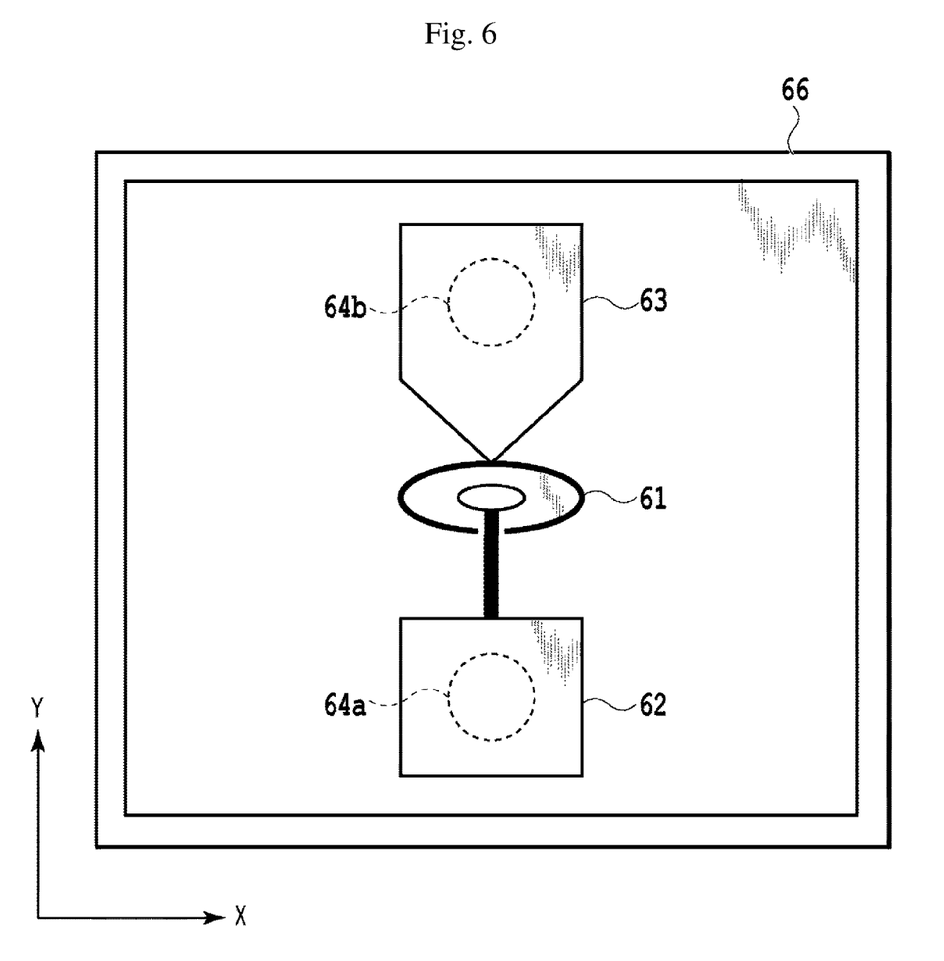
FIG. 6 is a top view of a chip region of a semiconductor wafer according to a second embodiment of the present invention.
Figure 7:
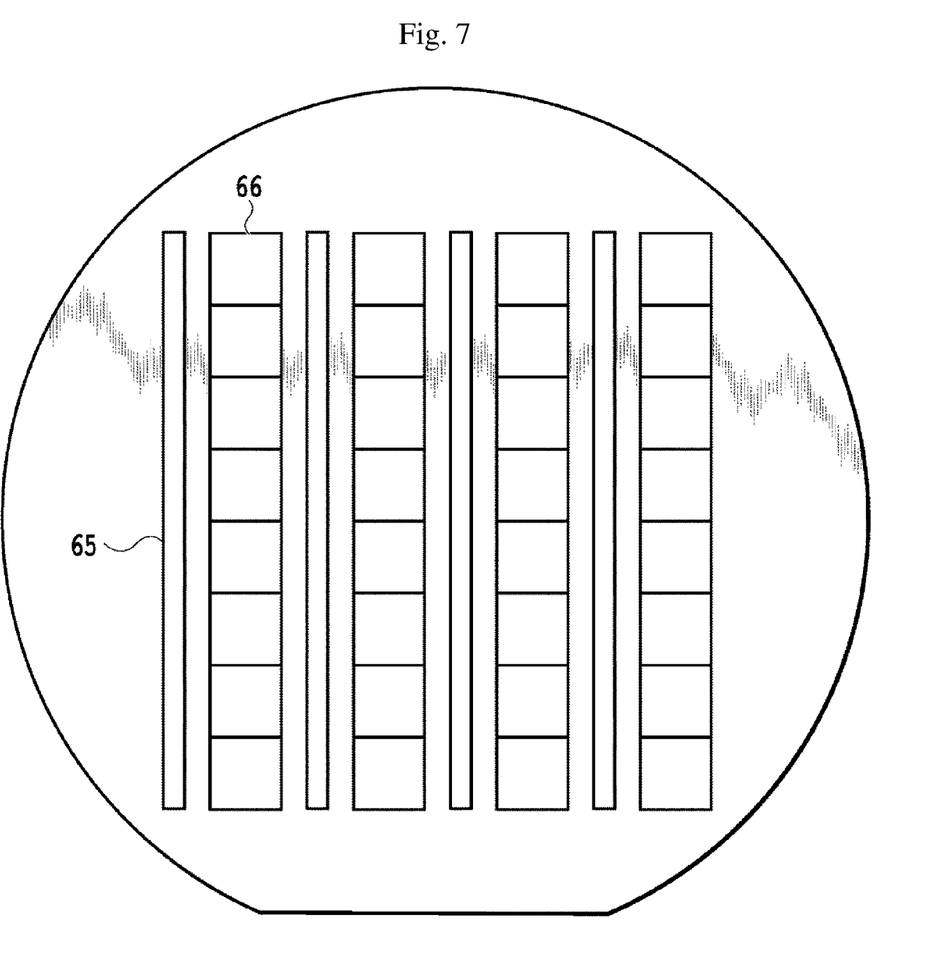
FIG. 7 is a top view of the entire semiconductor wafer according to the second embodiment of the present invention.

FIG. 6 illustrates a chip region portion according to a second embodiment of the semiconductor wafer according to the present invention. FIG. 7 is a top view of the entire semiconductor wafer according to the second embodiment of the present invention.

In the second embodiment, a second pad 65 being vertically long in a Y-axis direction is formed outside a scribe line 66 with a length extending over one row of chips. For one PD 61 formed inside the scribe line 66, probe needles 64a and 64b are respectively disposed at upper and lower sides in a one-to-one manner as illustrated in FIG. 6 to inspect the element. In this case, when the probe needles are shifted from positions of the first pads 62 and 63 in an X-axis direction, the contact check of the probe needles can be performed on the second pad 65 in FIG. 7. With the X-axis direction and the Y-axis direction of FIG. 7 replaced with each other, or with the semiconductor wafer rotated by 90 degrees, a plurality of second pads 65 being horizontally long are formed. Furthermore, the plurality of second pads 65 may be electrically connected to each other.

In the second embodiment, no second pad is present inside the scribe line 66, and thus, there is an advantage that the final chip size can be designed regardless of the second pad. However, wafer areas of the second pads 65 cannot be used for semiconductor elements.

Third Embodiment

Figure 8:
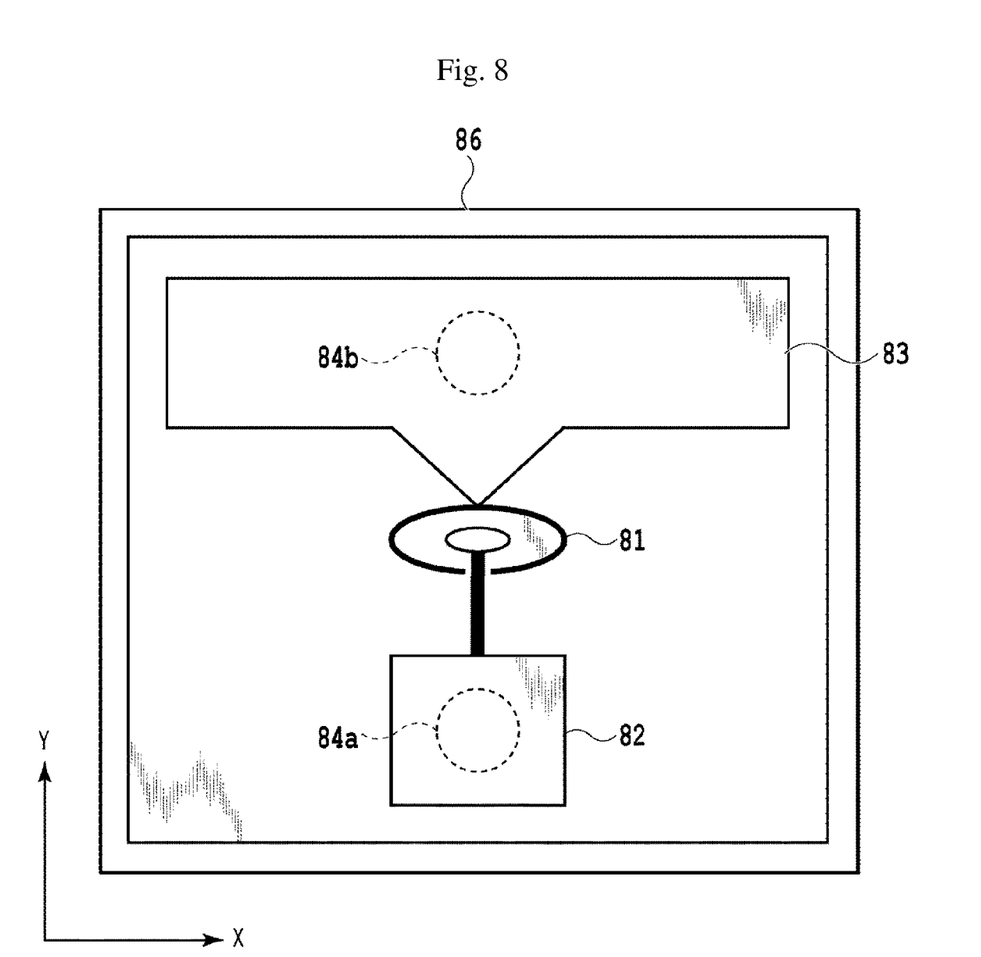
FIG. 8 is a top view of a chip region of a semiconductor wafer according to a third embodiment of the present invention.

FIG. 8 illustrates a top view of one chip of a semiconductor wafer according to a third embodiment of the present invention. A PD 81, and first pads 82 and 83 for applying voltage at the time of element inspection at upper and lower sides of the PD 81 are provided inside a scribe line 86. In the third embodiment, at least one of the first pads is provided as a first-and-second pad 83 that has a shape being long in the X direction, that also serves as a second pad, and that is provided inside the scribe line 86.

A length in the X direction of the first-and-second pad 83 is only required to be longer than a distance in the Y direction between two of the probe needles 84a and 84b, that is, a distance between centers of the pads. In the case of the present embodiment, measurement of the semiconductor elements is performed by rotating the wafer by 90 degrees from the position at the time of the contact check.

In the third embodiment, in a case where a rotation mechanism of 90 degrees or more is provided in a prober that moves the wafer, the chip size does not need to be doubled in the Y direction, and the first pad can be the first-and-second pad 83 that also serves as the second pad. However, the chip size increases in the X direction.

Fourth Embodiment

For manufacturing semiconductor devices, a method of forming a bonding pad in an adjacent manner to an element to make a flip-chip bonding structure and manufacturing a device in a flip-chip bonding process or the like has been widely used. The pad for the contact check does not contribute to an operation of the semiconductor element, and thus, the second pad may also serve as a bonding pad for a flip chip in all the embodiments.

When a pad is used for a flip-chip connection, high mounting workability is required, and thus, a pad having certain degrees of vertical and horizontal sizes is required. Thus, when the pad is used for the flip-chip connection, a pad size being equal to or larger than 50 µm×50 µm needs to be provided.

Furthermore, the symmetry of pad arrangement is also required from an aspect of strength, and thus it is desirable to prepare pads in a horizontally and vertically symmetrical manner in the chip.

Figure 9:
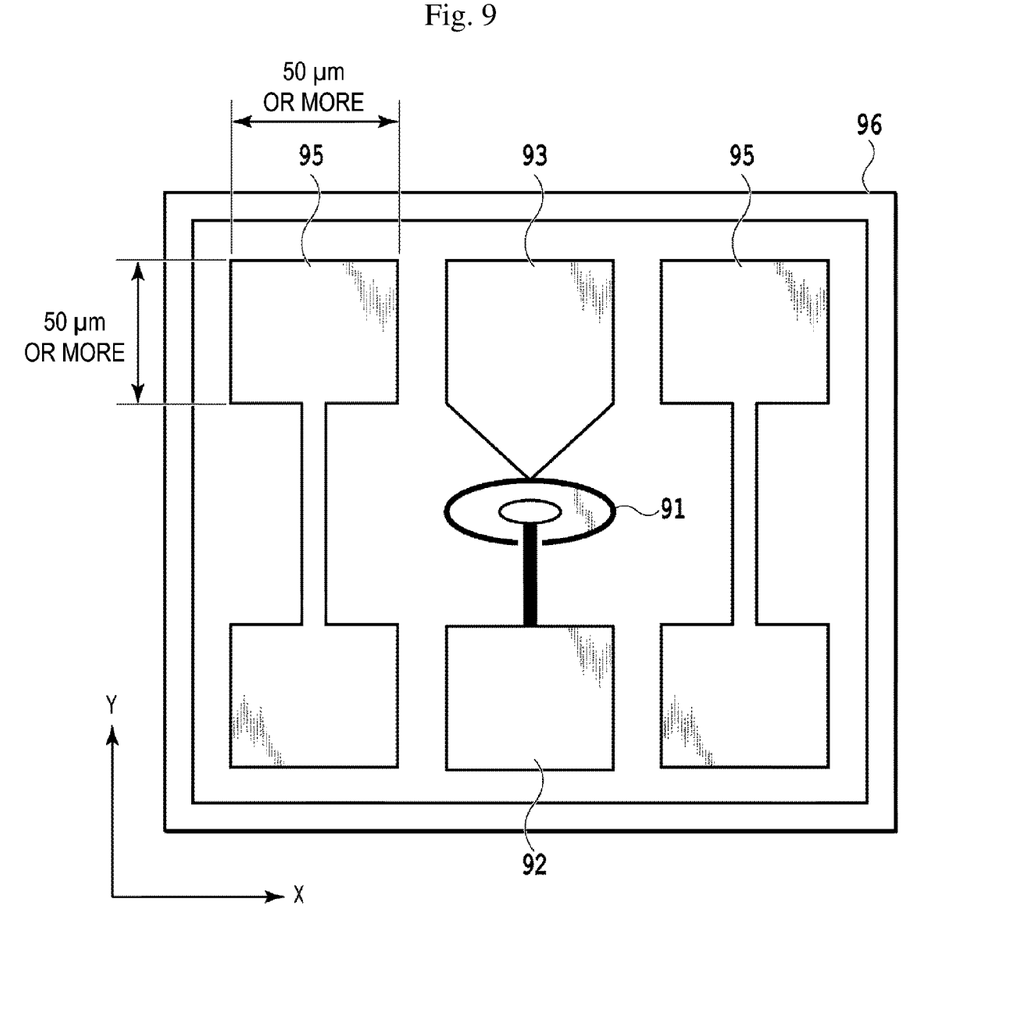
FIG. 9 is a top view of a chip region of a semiconductor wafer according to a fourth embodiment of the present invention.
Figure 10:
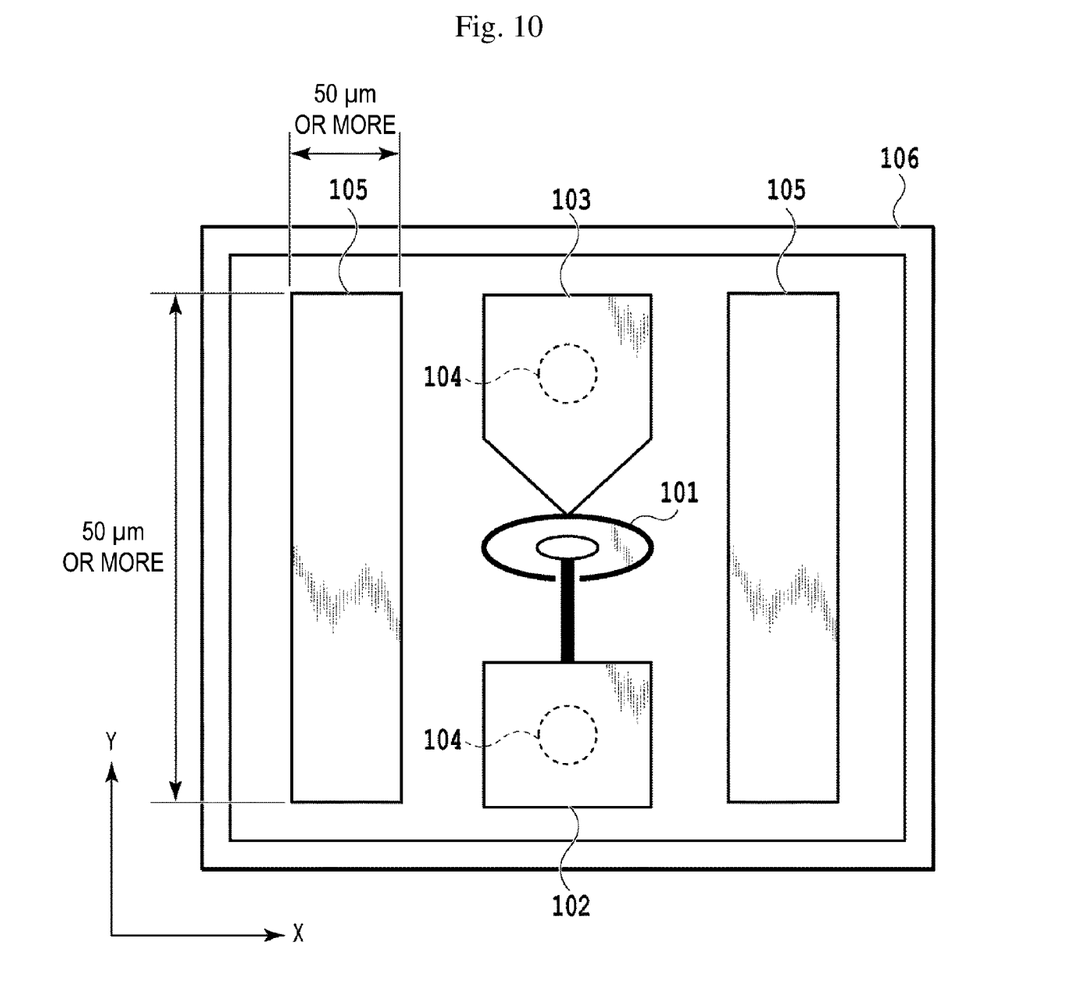
FIG. 10 is a top view of another example of the chip region of the semiconductor wafer according to the fourth embodiment of the present invention.

In a fourth embodiment in FIGS. 9 and 10, shape examples of a chip portion of a semiconductor wafer are illustrated in which second pads 95 and 105 are arranged to be also used for the flip-chip connection. The second pads 95 and 105 are arranged in a horizontally symmetrical manner with PD elements 91 and 101 sandwiched. Shapes of the pads are also vertically symmetrical. Thus, the second pads 95 and 105 have a vertically and horizontally symmetrical shape inside scribe lines 96 and 106 and have four pad portions in total. Lengths of conductive portions in the longitudinal direction of the second pads 95 and 105 may be respectively equal to or larger than distances between centers of the first pads 92 and 93, or 102 and 103, similarly to the example of the above-described embodiment, and as illustrated in FIG. 9, one portion of a plurality of pad portions having a minimum width being equal to or larger than 50 μm may be conducted.

As illustrated in FIG. 10, the shape of the second pad 105 may be a rectangular shape similar to those of FIGS. 1 and 3, or may be an iron dumbbell-like shape only a part of which is conducted, similarly to the second pad 95 illustrated in FIG. 9. In addition, a portion of the second pad that the probe needle touches may be a round shape or the like, rather than a rectangular shape. However, the diameter is desirably equal to or larger than 50 μm.

Fifth and Sixth Embodiments

Figure 11:
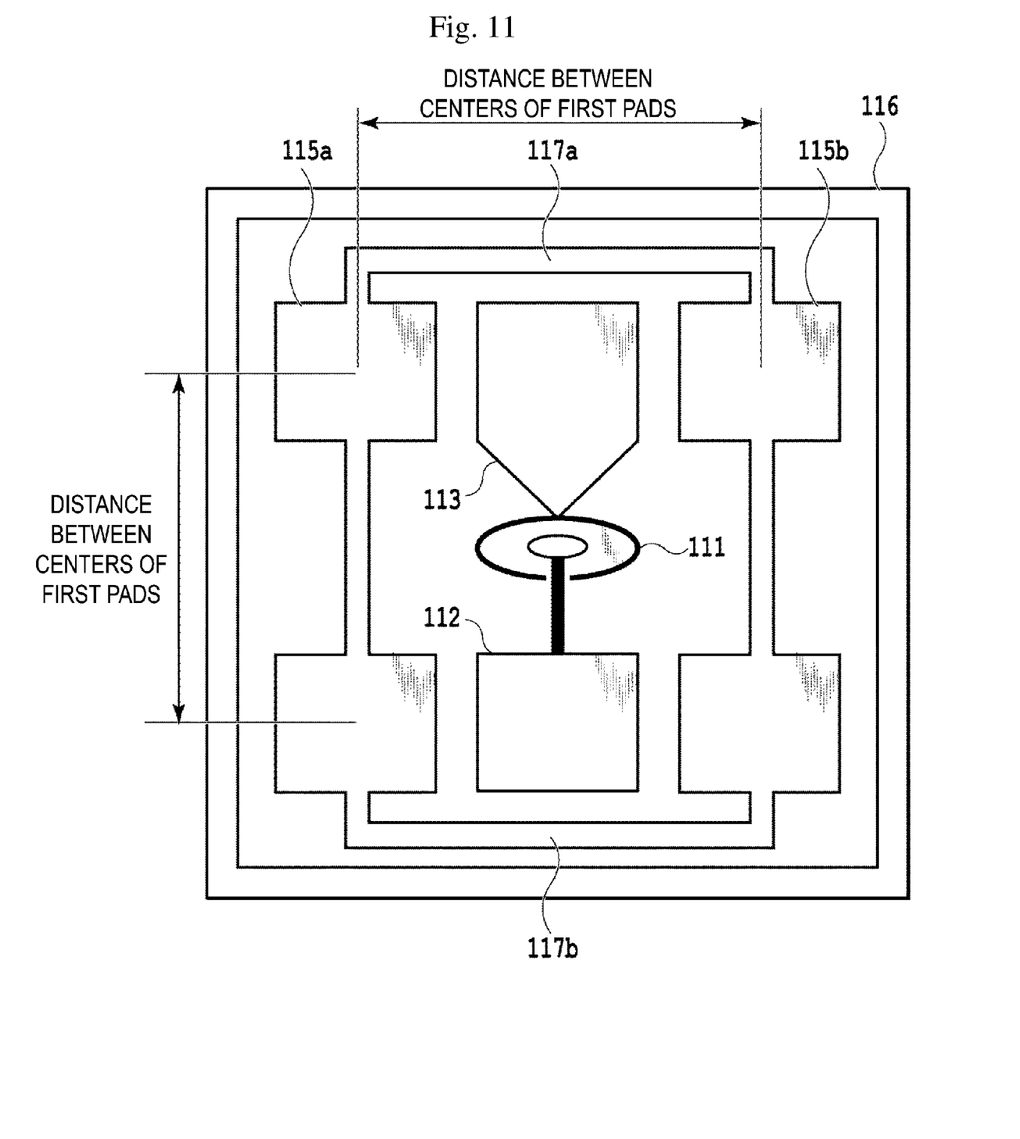
FIG. 11 is a top view of a chip region of a semiconductor wafer according to a fifth embodiment of the present invention.
Figure 12:
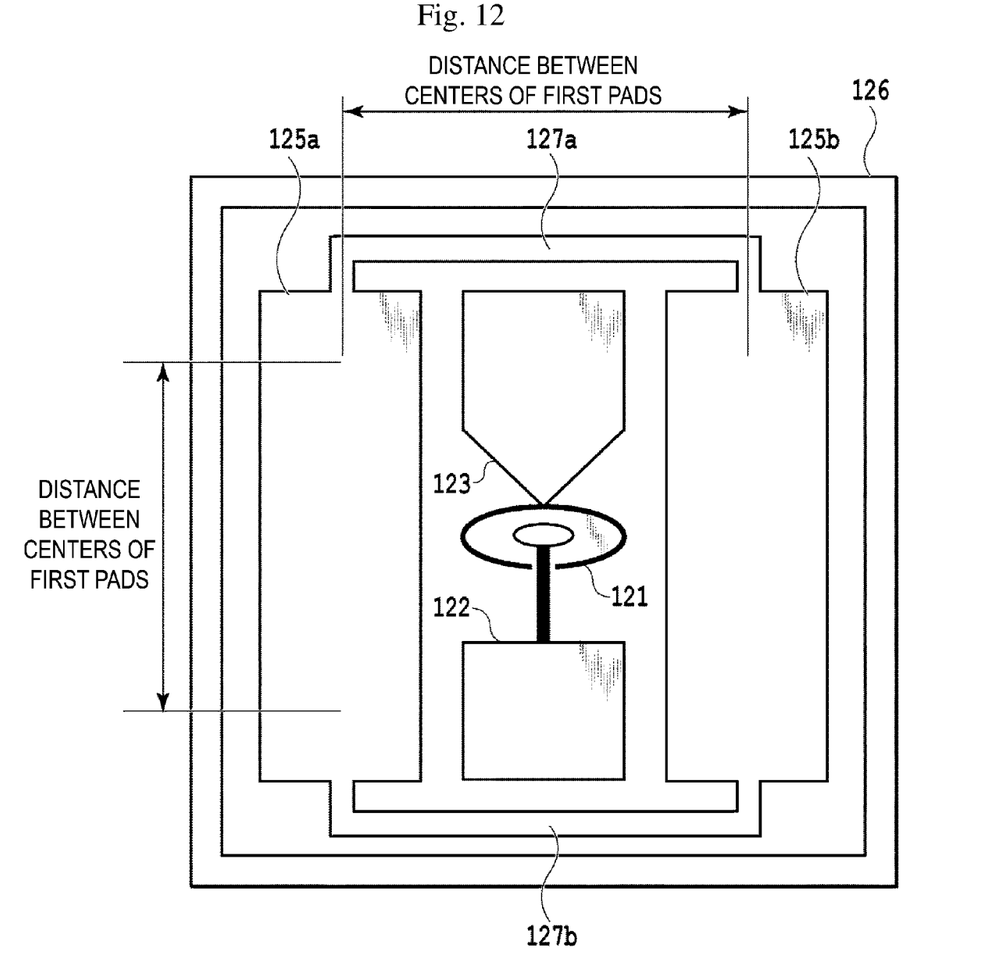
FIG. 12 is a top view of a chip region of a semiconductor wafer according to a sixth embodiment of the present invention.

FIGS. 11 and 12 respectively illustrate a shape of a chip portion of fifth and sixth embodiments of the semiconductor wafer according to the present invention. A pair of second pads 115*a* and 115*b* or a pair of second pads 125*a* and 125*b* formed in a horizontally symmetrical manner include a conductive portion connecting pad portions at both end portions to each other in the vertical direction (Y direction) in a manner to have a length being equal to or longer than a distance between centers of the first pads, and second conductive portions 117*a* and 117*b*, or 127*a* and 127*b* connecting pad portions at both end portions to each other in the horizontal direction (X direction) in a manner to have a length being equal to or longer than the distance between the centers of the first pads. With this shape, even when a portion is not conducted in the contact check because of some failure in the process, rotating the wafer by 90 degrees or horizontally moving the wafer can enhance the probability that the contact check can be performed in the same chip.

In each of the above-described embodiments, the second pad corresponding to the first pad is not necessarily provided in each of the chip regions of all the semiconductor elements, but when the second pad corresponding to the first pad is provided in each of the chip regions of all of the semiconductor elements, the contact check can be performed at once by using all the probes prepared for all the elements. This can lead to further improvement of measurement efficiency.

INDUSTRIAL APPLICABILITY

As described above, the semiconductor wafer of the present invention can achieve performing contact check of probe needles by only adding a simple electrode pattern.

The invention claimed is:

1. A semiconductor wafer formed with a plurality of chips each of which is formed with a semiconductor element to be inspected, the semiconductor wafer comprising:
    a set of first pads each of which is formed on a chip of the plurality of chips and each of which is configured to be connected with a probe needle to be connected to the semiconductor element, the probe needle being used for inspection of the semiconductor element; and
    a second pad configured to be used for contact check of the probe needle, the second pad corresponding to the set of first pads and having a conductive portion whose length is longer than a center-to-center distance of the set of first pads,
    wherein the second pad is present outside a scribe line of the chip and is connected to a second pad of another adjacent chip.
2. The semiconductor wafer according to claim 1, wherein the second pad is conductive to a part of the first set of pads within a range where inspection of the semiconductor element is not disturbed.
3. The semiconductor wafer according to claim 1, wherein a plurality of the second pads are disposed for one chip.
4. The semiconductor wafer according to claim 1, wherein the second pad includes a pad portion whose minimum width is equal to or larger than 50 μm, is disposed in the chip in a horizontally and vertically symmetrical manner, and is provided to every chip.
5. The semiconductor wafer according to claim 1, wherein the second pad includes a conductive portion whose length is larger than the center-to-center distance of the set of first pads at at least one or more positions in each of a vertical direction and a horizontal direction of the chip.
6. The semiconductor wafer according to claim 1, wherein the second pad is also used for flip-chip connection.
7. The semiconductor wafer according to claim 1, wherein a plurality of the second pads are disposed in one chip, and all of the plurality of second pads are conductive.

* * * * *